INVENTOR
JEAN MAURICE
By Young + Thompson
ATTYS.

Dec. 17, 1968   J. MAURICE   3,416,637
RADIALLY MOVABLE CLUTCH BEARING
Filed Dec. 12, 1966   4 Sheets-Sheet 2

INVENTOR
JEAN MAURICE
BY Young & Thompson
ATTYS.

INVENTOR
JEAN MAURICE
BY Young + Thompson
ATTYS.

Dec. 17, 1968  J. MAURICE  3,416,637
RADIALLY MOVABLE CLUTCH BEARING
Filed Dec. 12, 1966  4 Sheets-Sheet 4

INVENTOR
JEAN MAURICE
By Young & Thompson
Attys.

United States Patent Office 3,416,637
Patented Dec. 17, 1968

3,416,637
RADIALLY MOVABLE CLUTCH BEARING
Jean Maurice, Paris, France, assignor to Société Anonyme Française du Ferodo, Paris, France, a corporation of France
Filed Dec. 12, 1966, Ser. No. 601,134
Claims priority, application France, Dec. 20, 1965, 42,919
22 Claims. (Cl. 192—98)

ABSTRACT OF THE DISCLOSURE

A declutching device comprises a fork-driven actuating element slidable on a fixed guide and urging a driving element against the inner fingers of a Belleville washer to disenageg a clutch. As the fixed guide is not always exactly coaxial with the clutch, a self-centering coupling is provided between the actuating element and the driving element. This coupling is free to move in any direction perpendicular to the axis of the clutch against the action of a frictional grip.

---

The present invention relates to a declutching thrust device comprising an actuating element which is slidably engaged along a fixed guide, coaxial, within the imposed tolerances with the axis of the clutch, and a driving element adapted, under the action of the actuating element, to push a declutching device rotating in synchronism with the clutch about the clutch axis.

It may happen in practice that the fixed guide and the rotating declutching device are not very accurately centered with respect to each other. In an automobile vehicle, for example, the fixed guide is centered with respect to the gear box, while the rotating declutching device is centered with respect to the engine. However accurately the constructional arrangement is produced, slight displacements of the axes may occur, and the latter are most frequently parallel to each other with a small distance between them.

The off-centre contact between the driving element and the declutching device may give rise to rapid wear.

The present invention has for its object a declutching thrust device in which this disadvantage is obviated and which gives irreproachable operation over very long periods, even if the axes of the fixed guide and the declutching device are not exactly coaxial when assembled.

According to the invention, the said thrust device comprises a self-centering coupling interposed between the actuating element and the driving element, the said coupling acting in translation and having an omnidirectional latitude of travel in a plane perpendicular to the axis and controlled by a friction grip, in such manner that, if during assembly the axis of the guide and the axis of the clutch are not exactly coincident, the driving element takes up its own position and remains exactly centered with respect to the clutch axis. The centering obtained remains normally correct, without requiring to be re-adapted at each operation.

If however, during the course of use, the respective position of the axes became modified, the centering would be continuously maintained. This would also be the case if the device became displaced accidentally by a violent shock or unusual vibration, and the device would return of its own accord to its correct position upon the next operation.

According to another characteristic feature, the self-centering coupling comprises two concentric parts separated radially by an annular clearance and applied axially one against the other with the interposition of a friction washer, under the action of elastic means. These elastic means preferably comprise a Belleville washer.

According to a further characteristic feature of the invention, the thrust device comprises a rotating coupling actuated in translation and free in rotation, interposed between the actuating element and the driving element. This rotating coupling consists for example of a bearing, and is interposed between the self-centering coupling and the driving element.

In one form of construction, a first of the two roller tracks of the bearing is separated radially from the actuating element by an annular clearance and has one of its faces applied axially against a bearing surface of the actuating element, with the interposition of a friction washer, the other face being acted upon by elastic means, while the second rolling track is rigidly fixed to the driving element. For example, the first track may be the inner track and the second track is the outer track.

In an alternative form, the first track is the outer track and the second track is the inner track.

According to a further characteristic feature of this alternative, it is the inner track of the bearing itself, extended axially towards the declutching device, which forms a driving element of this device.

The elastic means acting on the outer track preferably consist of a Belleville washer, the outer periphery of which is applied against the outer track and the inner periphery is applied against a hood which is mounted on the actuating element and the friction washer, being separated by an annular clearance from the said outer track.

In one form of construction, the actuating element comprises on the one hand a cylindrical portion which is slidably engaged along the fixed guide and which is separated by another annular clearance from the inner rolling track, and on the other hand, a flat portion substantially perpendicular to the axis and in the form of a disc which is capped by the hood.

The hood preferably has two cylindrical portions which have different diameters and which are separated by a shoulder, the portion having the larger diameter enclosing the actuating element, while the portion having the smaller diameter encloses the outer track of the bearing and is spaced apart therefrom, being extended by a bent-back portion serving as a support for the Belleville washer.

According to a further characteristic feature, a keeper ring binds the hood and joins it to the fork, and comprises a portion of arcuate form extending over almost 360° and surrounding the hood at the point of the shoulder of the hood, the two extremities being respectively engaged in two gutter-shaped arms of the fork.

In addition, abutment means are provided in order to prevent rotation of the actuating element with respect to the fork. These means comprise two lugs fixed on the actuating element and extending into the vicinity of the of the two arms of the fork.

In one form of construction, the lugs are fixed to the disc-shaped portion of the actuating element and extend on each side of the two arms of the fork. In an alternative construction, the lugs are formed on a ring which is surrounded by the hood, together with the disc-shaped portion of the actuating element, the said lugs extending on each side of the two arms of the fork. In another alternative form, the lugs are formed by bending back projecting portions formed on the disc-shaped portion of the actuating element, the said lugs extending between the two arms of the fork.

In one form of embodiment, the friction washer is surrounded by the cylindrical portion of large diameter of the hood, while in an alternative form, the friction washer is surrounded by the cylindrical portion of smaller diameter of the hood.

The declutching device with which the driving element co-operates may, for example, comprise a diaphragm with or without a ring, or alternatively levers with or without a ring.

The present invention has also for its object a clutch of the diaphragm or lever type, or of any other suitable type, fitted with the declutching thrust device in accordance with the invention.

The objects, characteristic features and advantages of the invention will further be brought out in the description which follows below of forms of construction selected by way of example, reference being made to the accompanying drawings, in which.

Figure 1:
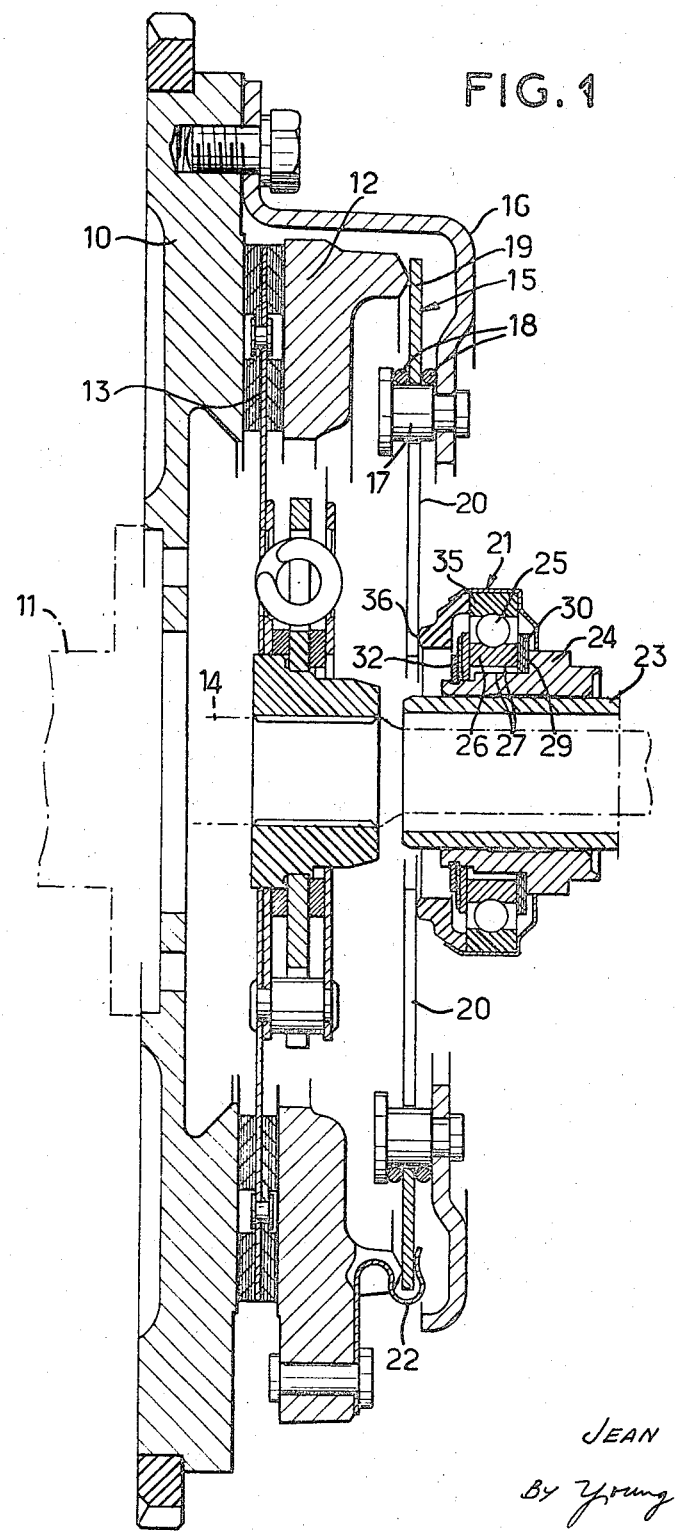
FIG. 1 is a general view in longitudinal section of a clutch provided with a declutching thrust device, improved in accordance with the invention.
Figure 2:
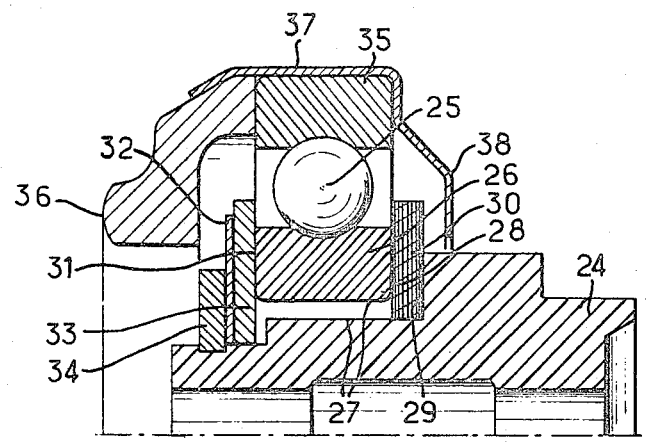
FIG. 2 is a partial view of this thrust device on a larger scale.

In the form of embodiment shown in FIGS. 1 and 2, which relates by way of example and without any implied limitation, to an application of the invention to a clutch of the diaphragm type, there is seen at 10 in FIG. 1 the fly-wheel of the clutch which is rigidly fixed to the driving shaft 11 and which forms an axially-fixed reaction plate. A pressure-plate 12 is movable axially and is fast for rotation with the plate 10 by any appropriate means (not shown), for example by a coupling with tangential tongues, tenons and mortices or the like. The plates 10 and 12 are intended to grip between them a friction disc 13 which is coupled to the receiving shaft 14 of the clutch.

The pressure-plate 12 co-operates with a diaphragm 15 which is mounted so as to rock on a cover 16 rigidly fixed to the reaction plate 10. This assembly comprises pillars 17 and two keeper rings 18. The peripheral portion 19 of the diaphragm 15 plays the part of a Belleville clamping washer, while the central portion comprises a series of declutching fingers 20, adapted to co-operate with a declutching thrust device 21.

When the thrust device 21 has no action on the fingers 20, the peripheral part 19 of the diaphragm 15 pushes the plate 12 elastically towards the plate 10, which grips the disc 13. The clutch is engaged.

When the thrust device 21 acts on the fingers 20 towards the left-hand side of FIG. 1, the diaphragm 15 rocks, which causes the elastic thrust action on the plate 12 to cease. This plate is moved towards the rear by stirrups 22 hooked on the diaphragm 15. The disc 13 is released and the clutch is therefore disengaged.

The declutching thrust device 21 is of the type which slides along a fixed guide 23, which is coaxial, within the prescribed tolerances, with the shaft of the rotating system 11, 10, 12, 16, 19 and 20 of the clutch.

According to the invention, the thrust device 21 is built and arranged in such manner that correct operation is ensured for the whole life of the equipment, even if the guide 23 is not very exactly coaxial with the axis of the portion 11, 10, 12, 16 and 15.

As shown in FIGS. 1 and 2, the thrust device 21 comprises an actuating element 24 which is slidably engaged along the fixed guide 23 and which is displaced by means of a fork or the like (not shown).

A ball bearing 25 has its inner track 26 which is separated radially by an annular clearance 27 from the actuating element 24. One of the faces 28 of the track 26 is applied axially against a bearing surface 29 of the element 24, with the interposition of a friction washer 30.

The other face 31 of the inner track 26 is subjected to the action of a Belleville washer 32 interposed between a washer 33 adjacent to the face 31 and a stop-ring 34 built into the element 24. The washer 32 which, in the example shown in FIG. 2, is pre-stressed until it is flat, ensures the calibration of the friction due to the washer 30.

The outer track 35 of the bearing 25 is associated with a driving element 36 which, when the actuating element 24 is moved along the guide 23, is intended to push the fingers 20 of the diaphragm 15 for the purpose of declutching. The mounting of the element 36 on the track 35 comprises a hood 37 of folded sheet steel, extended at 38 so as to form a grease-box.

Taking into account the clearance 27, the assembly 30, 32, 33 and 34 forms a self-centering coupling which acts in translation and which has, in a plane perpendicular to the axis, an omni-directional latitude of travel controlled by a friction-grip device.

If, at the time of assembly, the axis of the guide 23 and the axis of the portion 11, 10, 12, 16 and 15 are not exactly in coincidence, the first operation or operations of declutching have the effect of causing the driving element 36 and the bearing 25 to move with respect to the element 24 by a friction slip at 30, until the element 36 occupies a centered position with respect to the axis of the portion 11, 10, 12, 16 and 15. The element 36 then normally remains in this centered position by virtue of the friction grip at 30, maintained by the Belleville washer 32, which enables perfect operation to be obtained.

It should be noted that the arrangement according to the invention enables defects of alignment at the time of assembly to be remedied, especially when there is a parallel shift off-centre.

The centering obtained normally remains correct without requiring to be re-adapted for each operation. If however, during the course of use, the respective positions of the axes become modified, the centering will be constantly maintained. This would also be the case if the device shifted accidentally off-centre due to a violent shock or unusual vibration, and the device would return automatically to the correct position upon the next operation.

In the example shown in FIG. 1, the element 36 drives directly the fingers 20 of the diaphragm 15, but it would also be possible to provide the diaphragm 15 with a ring intended to be driven by the element 36. The thrust device 21 could furthermore co-operate with a declutching device comprising levers, with or without ring, instead of a diaphragm.

Figure 3:
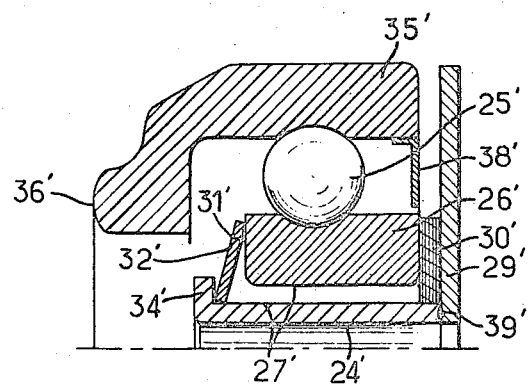
FIGS. 3 and 4 are views similar to that of FIG. 2, but relate respectively to two alternative forms.

Reference will now be made to FIG. 3, in which the arrangement is similar to that which has just been described with reference to FIGS. 1 and 2, but in which the sliding element indicated by 24' is of folded sheet steel and has an edge 34' playing the part of the circlip 34, while the bearing surface 29' is formed by a separate part fixed on the element 24' by any appropriate means, for example welding at 39', stapling, pressing, etc. The other members are similar to those of FIG. 2 and have been given the same reference numbers which are followed by a prime.

It will be observed from FIG. 3 that the washer 33 has been eliminated and that the Belleville washer 32' has a conical pre-stressed position and is not flattened. It will also be noted that the track 35' and the driving element 36' are formed by one single piece, which enables the hood 37 to be dispensed with. The grease-retaining wall 38' is simply a driving fit in the outer track 35'.

Figure 4:
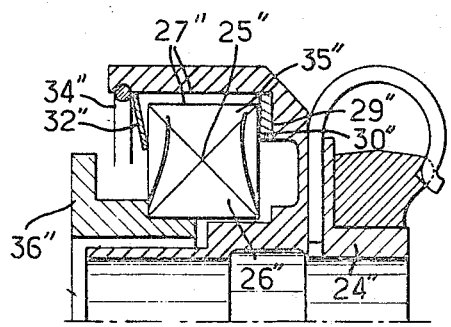

In a further alternative form shown in FIG. 4, in which the reference numbers are again the same but followed by a double prime, the bearing 25" is of the fluid-tight type, which renders unnecessary the grease retaining wall 38 of FIG. 2, or 38' of FIG. 3. It is the outer cage 35" of the bearing 25" which co-operates with the bearing surface 29" of the element 24", with the interposition of the friction washer 30" and which co-operates with the Belleville washer 32″, while the inner cage 26″ co-operates with the driving element 36″.

Figure 5:
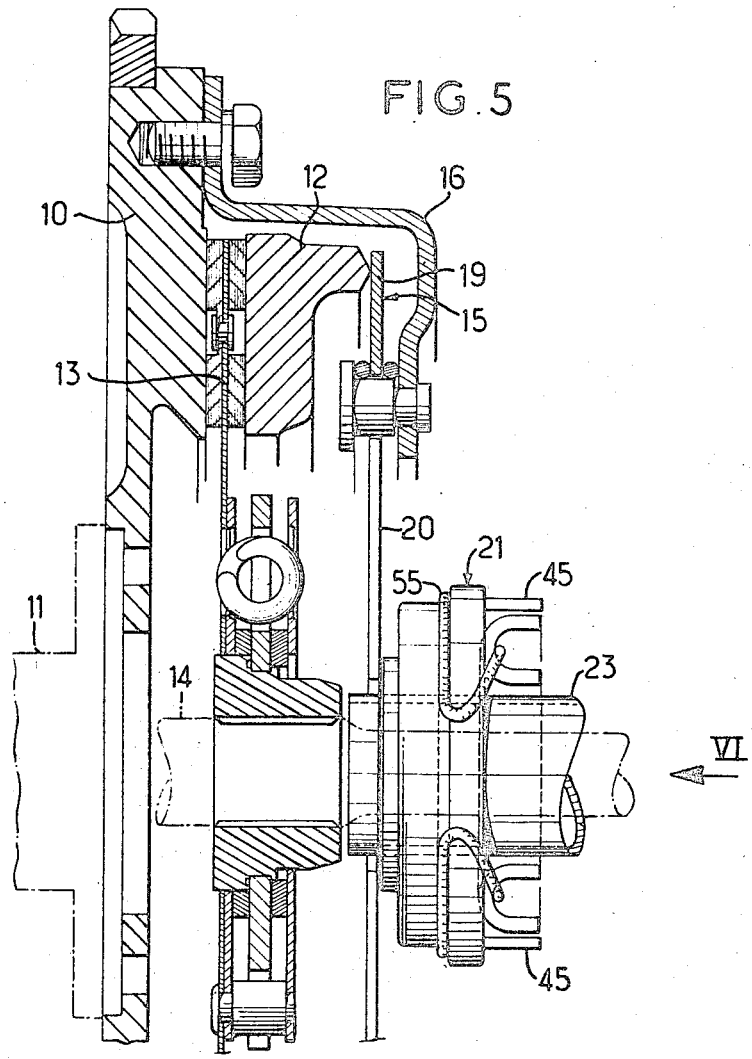
FIG. 5 is a view similar to FIG. 1, but showing a modified form of the invention.
Figure 6:
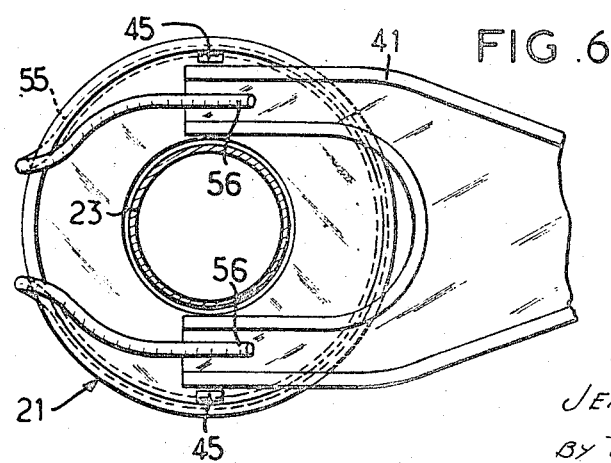
FIG. 6 is a partial view of FIG. 5 taken in the direction of the arrow VI in FIG. 5.
Figure 7:
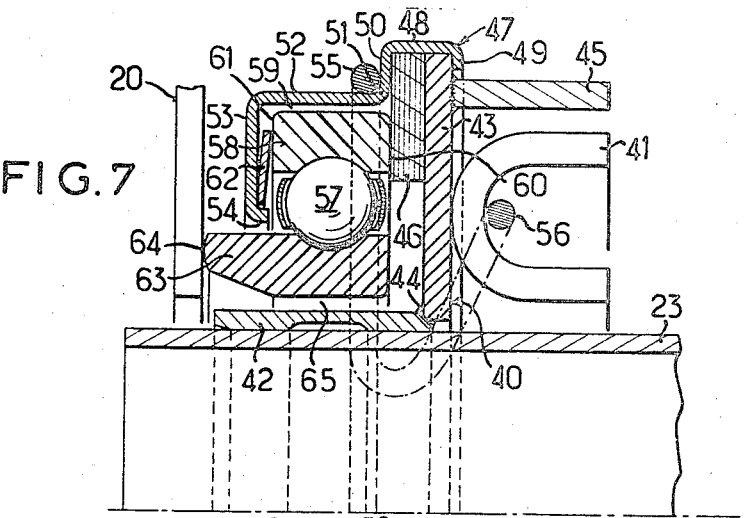
FIG. 7 is a view similar to FIG. 2 but of the embodiment of FIGS. 5 and 6.

Reference will now be made to FIGS. 5 to 7 in which, as previously, the declutching thrust device 21 is of the type sliding along a fixed guide 23 which is coaxial, within the required tolerances, with the axis of the rotating portion 11, 10, 12, 16 and 15 of the clutch, and is constructed and arranged in such manner that correct operation is ensured for the whole life of the equipment, even if the guide 23 is not very precisely coaxial with the axis of the portion 11, 10, 12, 16 and 15.

As shown in FIGS. 5 to 7, the thrust device 21 comprises an actuating element 40 which is slidably engaged along the fixed guide 23 and which is displaced by means of a fork 41. This fork has two arms, each of which has a section in the form of a gutter.

The element 40 comprises a cylindrical portion 42, by which it is engaged to slide along the guide 23, and a portion in the form of an annular disc 43 which is fixed, for example by welding at 44, to the part 42. On the disc 43 are welded two diametrically opposite lugs 45 which are located on each side of the arms of the fork 41 so as to prevent the element 40 from rotating with respect to the said fork 41.

Against the disc 43 is disposed a friction lining 46, while a hood 47 of folded sheet steel covers the assembly 43, 46.

The hood 47 comprises a cylindrical portion 48 surrounding the peripheral cylindrical faces of the disc 43 and the friction lining 46, an edge 49 folded back against the disc 43, an edge 50 folded back against the friction lining 46 and separated by a fillet 51 from another cylindrical portion 52 of smaller diameter than the portion 48, and followed in turn by a flat portion 53 perpendicular to the axis and by an edge 54.

In the fillet 51 is engaged a keeper-ring 55 serving to bind together the assembly 42, 43, 45, 46 and 47 to the fork 41. This keeper-ring 55 is circular and is associated with the greater portion of the circumference of the hood, and has two extremities 56 which are respectively engaged in the arms of the fork 41.

A ball bearing 57 has its outer track 58 which is separated radially by an annular clearance 59 from the cylindrical portion 52 of the hood 47. One of the faces 60 of the track 58 is applied axially against the friction lining 46.

The other face 61 of the outer track 58 is subjected to the action of a Belleville washer 62 supported against the face 53 of the hood 47. The washer 62 determines the load under which the friction lining 46 works.

The inner track 63 of the bearing 57 constitutes a driving element which, when the actuating element 40 is displaced along the guide 23, is intended to push at 64 on the fingers 20 of the diaphragm 15 for the purpose of declutching. The inner track 63 is separated from the cylindrical portion 42 of the element 40 by an annular clearance 65.

Taking into account the clearances 59 and 65, the assembly 46, 62 and 47 forms a self-centering coupling acting in translation and having, in a plane perpendicular to the axis an omni-directional latitude of travel controlled by a friction grip device.

If at the time of assembly, the axis of the guide 23 and the axis of the assembly 11, 10, 12, 16 and 15 are not exactly in coincidence, the first operation or operations of declutching have the effect of causing the driving element 63 of the bearing 57 to move with respect to the element 40 by frictional slip at 60, until the bearing 57 takes up a centered position with respect to the axis of the portion 11, 10, 12, 16 and 15. The bearing 57 then normally remains in this centered position by virtue of the friction gripping action at 60, 46, maintained by the Belleville washer 62, which enables perfect operation to be obtained.

It should be observed that the arrangement shown in FIGS. 5 to 7 makes it possible, as previously, to remedy defects in alignment at the time of assembly, especially when there is a parallel shift off-centre. The centering obtained normally remains correct, without there being any need for re-adaptation for each operation. If however, during the course of use, the respective positions of the axes become modified, the centering would be constantly re-established. This would also be the case if the device became accidentally displaced, for example due to the effect of a violent shock or unusual vibration, and the device would return automatically to the correct position for the next operation.

In the example shown in FIG. 5, the element 63 directly drives the fingers 20 of the diaphragm 15, but it would also be possible to provide the diaphragm 15 with a ring intended to be driven by the element 63. The thrust device 21 could furthermore co-operate with a declutching device which is provided with levers, with or without ring, instead of a diaphragm. In the alternative form shown in FIG. 8, the arrangement is similar to that which has just been described above with reference to FIGS. 5 to 7, but the lugs 45 welded to the disc 43 and co-operating with the arms of the fork 41 in order to prevent rotation of the element 40 are dispensed with and are replaced by a ring 66 which is capped by the hood 47 at the same time as the friction lining 46 and the disc 43, and which is provided with folded-back lugs 67. These lugs 67 are arranged on each side of the arms of the fork 41 and play the same part as the lugs 45.

Figure 8:
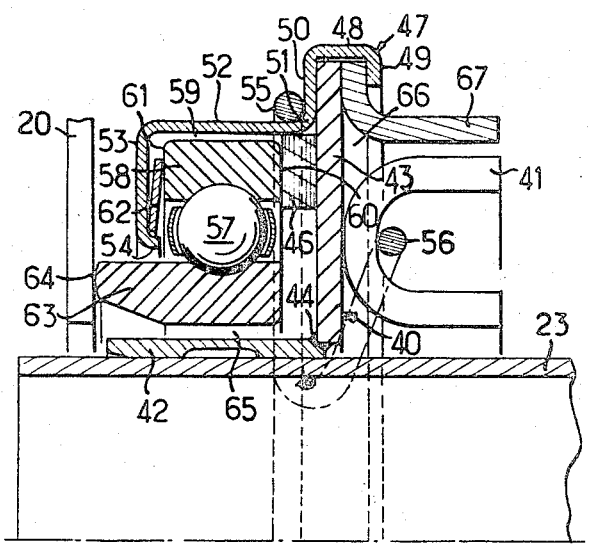
FIG. 8 is a view similar to FIG. 7 but showing a modified form of the invention.

It will be noted that the lugs 45 of FIG. 7 and the lugs 67 of FIG. 8 are located on the outside of the arms of the fork 41, but it would also be possible to provide lugs arranged between the said arms and having the same function of preventing rotation of the element 40. This is the case for example of the lugs 68 which are shown in FIG. 9, and which are formed by folding-back projecting portions formed in a corresponding manner on the disc 43.

Figure 9:
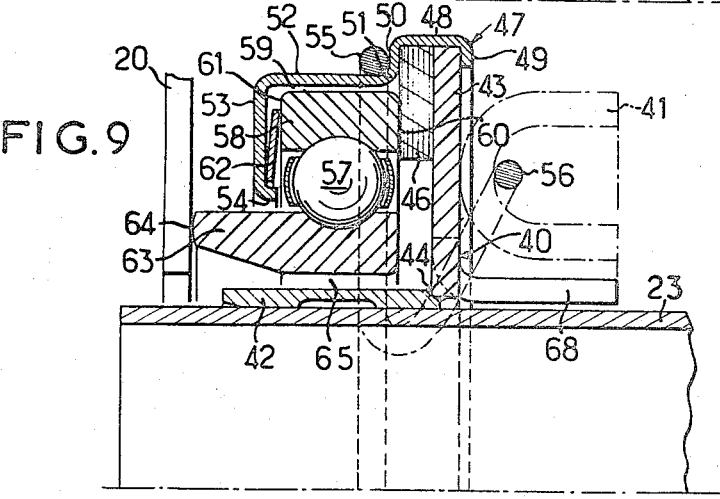
FIG. 9 is a view similar to FIGS. 7 and 8 but showing a further modification.

It will be observed that in FIGS. 7 and 9, the friction washer 46 is covered by the cylindrical portion 48 of large diameter of the hood 47, whereas in FIG. 8, it is covered by the cylindrical portion 52 of smaller diameter of the said hood 47.

It will of course be understood that the invention is not restricted to the forms of construction described and shown, but includes any alternative form. For example, the device has been shown with a control by fork, but it could obviously comprise any other appropriate control, for example hydraulic, etc.

What I claim is:

1. In a rotary clutch having a declutching device rotating in synchronism with a clutch about the axis of the clutch, a driving element to move the declutching device, a fixed guide substantially coaxial with the clutch, and an actuating element slidable along the fixed guide to move the driving element; the improvement comprising a self-centering rotary coupling positioned to transmit thrust from the actuating element to the driving element in a direction parallel to the axis of the clutch, means mounting the coupling for movement in any direction in a plane perpendicular to the axis of the clutch, and friction means retarding said movement of the self-centering coupling, whereby, if during assembly the axis of said guide and the axis of the clutch are not exactly in coincidence, at least a portion of said coupling automatically changes position and remains precisely centered with respect to the axis of said clutch.

2. Apparatus as claimed in claim 1, said friction means comprising a friction washer disposed between said actuating element and said self-centering coupling, and elastic means yieldably urging said actuating element and said self-centering coupling together.

3. Apparatus as claimed in claim 2, said elastic means comprising a Belleville washer.

4. Apparatus as claimed in claim 1, said coupling comprising a pair of annular races with antifriction means between them, said driving element being carried by one of said races.

5. Apparatus as claimed in claim 4, and a friction washer disposed between said actuating element and the other of said races.

6. Apparatus as claimed in claim 4, said antifriction means comprising ball bearings.

7. Apparatus as claimed in claim 4, said races comprising an inner race and an outer race, the inner surface of said inner race having substantial clearance radially inwardly in all directions.

8. Apparatus as claimed in claim 4, said one race and said driving element being integral.

9. Apparatus as claimed in claim 4, said one race being disposed radially outwardly of the other said race.

10. Apparatus as claimed in claim 4, said one race being disposed radially inwardly of the other said race.

11. Apparatus as claimed in claim 10, said driving element and said one race being integral.

12. Apparatus as claimed in claim 4, and a friction washer disposed between said actuating element and the other said race, elastic means urging said actuating element and said other race toward each other, said elastic means comprising a Belleville washer, one periphery of said Belleville washer bearing against said other race, the other periphery of said Belleville washer bearing against a member fixed to said actuating element.

13. Apparatus as claimed in claim 12, said other race being disposed radially outwardly of said one race, said member fixed to said actuating element comprising a hood which covers said actuating element and said friction washer and said other race.

14. Apparatus as claimed in claim 13, said hood comprising two cylindrical portions of different diameters separated by a shoulder, the portion having the larger diameter surrounding said actuating element and the portion having the smaller diameter surrounding said outer race in spaced relation, said hood having a folded-back portion serving as a support for the Belleville washer.

15. Apparatus as claimed in claim 12, and a keeper ring encompassing said hood, and a fork for moving said actuating element, said keeper ring joining said hood to said fork and having a portion of arcuate form extending over almost 360° and surrounding said hood at a shoulder on said hood, said keeper ring having two arms that engage with said fork.

16. Apparatus as claimed in claim 15, and abutment means for preventing rotation of said actuating element relative to said fork.

17. Apparatus as claimed in claim 16, said abutment means comprising two lugs rigidly fixed to said actuating element and extending into the vicinity of the arms of the fork.

18. Apparatus as claimed in claim 17, said lugs being fixed to the actuating element and extending on opposite outer sides of the two arms of said fork.

19. Apparatus as claimed in claim 17, and a ring surrounded by said hood, said lugs being formed on said ring and extending on opposite sides of the arms of said fork.

20. Apparatus as claimed in claim 17, said lugs comprising bent-back projecting portions of said actuating element, said lugs extending between the arms of said fork.

21. Apparatus as claimed in claim 13, said hood having portions of different diameter, said friction washer being surrounded by a relatively large diameter portion of said hood.

22. Apparatus as claimed in claim 13, in which said hood has portions of different diameter, said friction washer being surrounded by a relatively small diameter portion of said hood.

References Cited

UNITED STATES PATENTS

| | | | |
|---|---|---|---|
| 2,995,406 | 8/1961 | Pitner. | |
| 3,277,988 | 10/1966 | Pitner | 192—98 |
| 3,317,014 | 5/1967 | Pitner | 192—98 |
| 3,333,664 | 8/1967 | Chapaitis | 192—98 |
| 3,333,665 | 8/1967 | Einchcomb et al. | 192—98 |

BENJAMIN W. WYCHE, III, *Primary Examiner.*

U.S. Cl. X.R.

308—35

REEXAMINATION CERTIFICATE (230th)
United States Patent [19]
Maurice

[11] B1 3,416,637
[45] Certificate Issued Aug. 14, 1984

[54] RADIALLY MOVABLE CLUTCH BEARING

[75] Inventor: Jean Maurice, Paris, France

[73] Assignee: Société Anonyme Francaise du Ferodo, Paris, France

Reexamination Request:
No. 90/000,401, Jun. 15, 1983

Reexamination Certificate for:
Patent No.: 3,416,637
Issued: Dec. 17, 1968
Appl. No.: 601,134
Filed: Dec. 12, 1966

[30] Foreign Application Priority Data

Dec. 20, 1965 [FR] France ............... 65.42919

[51] Int. Cl.³ .......................................... F16D 23/14
[52] U.S. Cl. ................................................ 192/98
[58] Field of Search ................................... 192/98

[56] References Cited

U.S. PATENT DOCUMENTS

| | | | |
|---|---|---|---|
| 2,012,997 | 9/1935 | Junkers | 308/26 |
| 2,030,813 | 2/1936 | Dolza | 192/98 X |
| 2,725,965 | 12/1955 | Binder | 192/98 |
| 2,995,406 | 8/1961 | Pitner | 192/98 X |
| 3,212,611 | 10/1965 | Ruoff et al. | 192/98 X |
| 3,277,988 | 10/1966 | Pitner | 192/98 |
| 3,317,014 | 5/1967 | Pitner | 192/98 |
| 3,333,664 | 8/1967 | Chapaitis | 192/98 |
| 3,333,665 | 8/1967 | Einchcomb et al. | 192/98 X |

FOREIGN PATENT DOCUMENTS

| | | |
|---|---|---|
| 569082 | 7/1958 | Belgium . |
| 1777194 | 11/1958 | Fed. Rep. of Germany . |
| 836233 | 1/1939 | France . |
| 1077464 | 11/1954 | France . |
| 1140262 | 7/1957 | France . |
| 1279567 | 11/1961 | France . |
| 1319919 | 3/1963 | France . |
| 1323739 | 3/1963 | France . |
| 1342911 | 10/1963 | France . |
| 1354390 | 1/1964 | France . |
| 1372747 | 8/1964 | France . |
| 1373083 | 8/1964 | France . |
| 1376167 | 9/1964 | France . |
| 1387978 | 2/1965 | France . |
| 84974 | 4/1965 | France . |
| 1402558 | 6/1965 | France . |
| 1418379 | 10/1965 | France . |
| 34-7455 | 8/1959 | Japan . |
| 124890 | 5/1949 | Sweden . |
| 259196 | 6/1949 | Switzerland . |
| 496369 | 11/1938 | United Kingdom . |
| 531046 | 12/1940 | United Kingdom ............ 192/98 |
| 795212 | 5/1958 | United Kingdom . |
| 1010775 | 11/1965 | United Kingdom . |
| 1022077 | 3/1966 | United Kingdom . |
| 1028017 | 5/1966 | United Kingdom . |
| 1028778 | 5/1966 | United Kingdom . |
| 1028967 | 5/1966 | United Kingdom . |

*Primary Examiner*—Rodney H. Bonck

[57] ABSTRACT

A declutching device comprises a fork-driven actuating element slidable on a fixed guide and urging a driving element against the inner fingers of a Belleville washer to disengage a clutch. As the fixed guide is not always exactly coaxial with the clutch, a self-centering coupling is provided between the actuating element and the driving element. This coupling is free to move in any direction perpendicular to the axis of the clutch against the action of a frictional grip.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–11 is confirmed.

Claim 12 is determined to be patentable as amended:

Claims 13–22, dependent on amended claims, are determined to be patentable.

New claims 23–26 are added and determined to be patentable.

12. Apparatus as claimed in claim 4, [and] *said friction means comprising* a friction washer disposed between said actuating element and the other said race, *and* elastic means urging said actuating element and said other race toward each other, said elastic means comprising a Belleville washer, one periphery of said Belleville washer bearing against said other race, the other periphery of said Belleville washer bearing against a member fixed to said actuating element.

23. *In a rotary clutch having a declutching device rotating in synchronism with the clutch about the axis of rotation of the clutch, a fixed guide aligned substantially coaxially with the clutch, a thrust device comprising a driving element to move the declutching device and an actuating element slidable along the fixed guide to move the driving element; the thrust device comprising a self-centering rotary coupling positioned to transmit thrust from the actuating element to the driving element in a direction parallel to the axis of the clutch, means mounting the coupling for movement in a plane perpendicular to the axis of the clutch, friction grip means constantly axially gripping the self-centering rotary coupling and imparting friction for retarding the movement thereof, wherein, if during assembly the axis of said guide and the axis of the clutch are not in coincidence, said coupling automatically changes position during declutching to a position centered relative to the axis of rotation of the clutch and thereafter remains permanently in a concentric position with respect to the axis of rotation of said clutch.*

24. *Apparatus as claimed in claim 23, wherein said friction grip means includes elastic means yieldably urging said actuating element and said self-centering rotary coupling together, said self-centering rotary coupling being gripped in friction contact relative to said actuating element.*

25. *Apparatus as claimed in claim 23, wherein said friction grip means includes a friction washer disposed between said actuating element and said self-centering rotary coupling.*

26. *Apparatus as claimed in claim 23, said rotary coupling comprising a bearing having an inner race, an outer race and antifriction elements therebetween, wherein one of said races is fixed for rotation with said driving element and the other of said races is axially gripped by said friction grip means against said actuating element.*

* * * * *